United States Patent [19]

Schneider

[11] Patent Number: 5,891,935
[45] Date of Patent: Apr. 6, 1999

[54] PROCESS FOR PREPARING POLYMERIC BINDERS AND THEIR USE FOR ANTIFOULING PAINT SYSTEMS

[75] Inventor: Uwe Schneider, Dortmund, Germany

[73] Assignee: Witco GmbH, Bergkamen, Germany

[21] Appl. No.: 956,823

[22] Filed: Oct. 23, 1997

[30] Foreign Application Priority Data

Nov. 7, 1996 [EP] European Pat. Off. ............ 96203101

[51] Int. Cl.[6] ........................ C09J 201/02; C08F 8/42; C08F 230/04
[52] U.S. Cl. .................. 523/177; 523/122; 526/240; 526/257; 106/14.13; 106/15.05
[58] Field of Search .................. 523/122, 177; 526/240, 257; 106/14.13

[56] References Cited

U.S. PATENT DOCUMENTS

| | | | |
|---|---|---|---|
| 4,104,234 | 8/1978 | Bednarski et al. | 523/177 |
| 4,121,034 | 10/1978 | Bednarski et al. | 526/240 |
| 4,174,339 | 11/1979 | Matsuda et al. | 523/177 |
| 4,499,022 | 2/1985 | Battais et al. | 556/19 |
| 4,769,398 | 9/1988 | Kanda et al. | 523/122 |
| 4,914,141 | 4/1990 | Matsuo et al. | 523/122 |
| 5,332,430 | 7/1994 | Gerigk et al. | 523/122 |
| 5,472,993 | 12/1995 | Kim et al. | 526/240 |

FOREIGN PATENT DOCUMENTS

| | | |
|---|---|---|
| 34936/89 | 11/1989 | Australia . |
| 0 200 433 | 11/1986 | European Pat. Off. . |
| 0 204 444 | 12/1986 | European Pat. Off. . |
| 0 331 147 | 9/1989 | European Pat. Off. . |
| 279 258 | 5/1990 | Germany . |
| 0164261 | 12/1980 | Japan . |
| 1 457 590 | 12/1976 | United Kingdom . |
| 2 152 947 | 8/1985 | United Kingdom . |
| WO84/02915 | 8/1984 | WIPO . |

*Primary Examiner*—Tae Yoon
*Attorney, Agent, or Firm*—Scully, Scott, Murphy & Presser

[57] ABSTRACT

The invention relates to binders for antifouling coating compositions, which can be prepared by copolymerizing polymerizable monomers, wherein, as polymerizable monomers, mixtures of A) at least one of the compounds of the general formula I

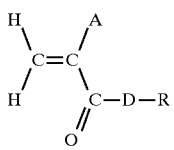

and B) at least one ethylenically unsaturated compound having the general formula II

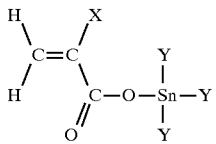

with or without C) at least one ethylenically unsaturated compound are polymerized.

14 Claims, No Drawings

PROCESS FOR PREPARING POLYMERIC BINDERS AND THEIR USE FOR ANTIFOULING PAINT SYSTEMS

FIELD OF THE INVENTION

The present invention relates to a process for preparing polymerizable, slowly hydrolyzable compounds which can be used to prepare binder systems for antifouling paints to protect underwater areas against infestation by marine organisms.

BACKGROUND OF THE INVENTION

Surfaces under continual exposure to sea water, for example ships, buoys, drilling platforms, underwater pipelines, fishing nets, etc., are under appropriate conditions colonized within a short time by marine organisms such as algae, seaweed, bivalves, tape worms, sponges, etc. This infestation is extremely disruptive in a large number of cases and is restrictive and a hindrance to the service properties of numerous facilities. For example, colonization of underwater ship areas leads to a restriction on the maneuverablilty of the ships and, because of the increased frictional resistance in the water, to a marked increase in fuel consumption.

For these reasons, infestation-preventing coating materials, known as antifouling paints, are employed widely for protecting underwater areas against colonization. These coating materials consist in most cases of a biocidal or nonbiocidal polymer and film-forming binder, co-biocides and pigments.

Frequently employed antifouling paints of recent years possess not only infestation-preventing but also self-polishing polymer film properties. In these systems the self-polishing effect is achieved by controlled hydrolysis of functional groups, leaving the surface of the coating hydrophilic and therefore erodible; coatings of this kind are described, for example, in EP-A-O 289 481. Antifouling paints which have found particularly broad use are those whose copolymers include triorganotin esters, especially tri-n-butyltin esters, of unsaturated carboxylic acids, for example (meth)acrylic acid. Examples of these are given in GB-A-1 457 590. Owing to the slow hydrolysis of the triorganotin ester group, these systems possess self-polishing properties coupled, through the biocidal action of the organotin compound, with outstanding antifouling properties. This particularly favorable combination of properties has led to widespread use of tin-based antifouling paints.

In years gone by there has been discussion about the use of tributyltin-and triphenyltin-containing coating compositions, since the rates of release of the organotin compounds into the sea water that have been customary to date do not appear to be necessary in all regions. Thus in some countries the release rate of tin-containing antifouling paints has been restricted to 4 $\mu$g cm$^{-2}$ d$^{-1}$ TBT (tributyltin) and they can only be used on ships with a length of more than 25 m. There is therefore a need for effective, slowly hydrolyzable antifouling paint systems which are of reduced tin content and yet have adequate self-polishing properties.

The literature describes various examples of tin-containing antifouling paints which in addition to an organotin-containing monomer also include various other functionalized monomers. Thus EP 0 342 493 cites copolymers of tributyltin methacrylate, acrylamide and acrylic acid. Other systems are described in EP 0 200 433 (copolymers of tributyltin methacrylate, methyl methacrylate, styrene, ethylene glycol dimethacrylate and acrylonitrile), AU 466 764 (copolymers of tributyltin acrylate and vinyl acetate) and DD 279 258 (copolymers of tributyltin acrylate, methyl methacrylate and polyethylene glycol monoacrylate). However, all of these systems have either found no widespread commercial use or do not have the particularly favorable combination of infestation-preventing and self-polishing properties.

Furthermore, various examples of antifouling paints are mentioned which have groups which are hydrolyzable in sea water. For example, WO 84/02915 cites a large number of possible groups which should, with groups containing carboxylic acids, form readily hydrolyzable compounds. EP 0 204 444. EP 0 331 147 and GB 2 152 947 also describe ester-containing polymer systems for the antifouling sector. All of these systems, however, either have found no widespread commercial use or require a relatively complex multistage synthesis process for their preparation.

BRIEF SUMMARY OF THE INVENTION

It has now been found that polymers composed of a combination of organotin-containing (meth)acrylates - for example tributyltin methacrylate (TBTM)—and specific functionalized (meth) acrylates show particularly favorable combinations of properties for use as an antifouling paint system. In these systems, the tin content of the polymers can be reduced to well below the commercially customary levels of about 20% by weight (or more) without losing the infestation-preventing and self-polishing properties. The reduced hydrolysis as a result of the lower content of organotin-containing monomers is compensated in these systems by the content of functionalized (meth) acrylate monomers which undergo controlled hydrolysis, and which may have a complementary infestation-preventing property. This hydrolysis is an alkaline medium (sea water pH: 8.1–8.3) is a prerequisite firstly for self-polishing properties and secondly for an infestation-preventing effect of the paint by means of slow, continuous release of the hydrolyzed compounds. A particular advantage of the present invention is that the functionalized (meth) acrylate monomers are chemically bonded in a linear polymer system with little branching or crosslinking and that the slow hydrolysis of the organotin and (meth)acrylic ester groups which this allows is able to produce partially hydrophilic and thus soluble polymer surfaces.

The present invention accordingly provides binders for antifouling coating compositions, preparable by copolymerization of a mixture of polymerizable monomers, wherein, the mixture comprises A) at least one compound of the general formula I

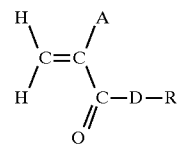

in which:
A=H or CH$_3$
D=O or S
R=Ph (R$^1$)$_n$, —C(CH$_2$COOR$^2$)$_2$(COOR$^2$), —CH$_2$—CH$_2$—O—Ph, —C(H)$_{3-(p+q)}$(CO—R$^2$)$_q$ (COOR$^2$)$_q$ or substituted or unsubstituted thiadiazolyl compounds
Ph=phenyl
R$^1$=identical or different in each occurance and is —C(O)H, —COOR$^2$, —CH$_2$—COOR$^2$, —O—R$^2$, —NH—CO—R$^2$, —NH$_2$, halogen n=1-3
p=0-3
q=0-3
p+q=1-3
$R^2$=identical or different in each occurrence and is H, or an unsubstituted alkyl, aryl, cycloalkyl or aralkyl radical having 1–10 carbon atoms and B) at least one ethylenically unsaturated compound having the general formula II

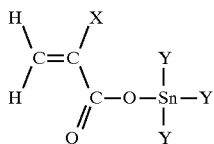

II in which
X=H, $CH_3$
Y=$C_4$–$C_{12}$ alkyl, phenyl or cyclohexyl in which the molar ratio of A to B is from 1:1 to 5:1 and optionally C) at least one ethylenically unsaturated compound, the molar ratio of (A +B) to C being from 1:0 to 1:10, are polymerized.

The invention also provides binders for antifouling coating compositions, produced by a process wherein in stage 1, a mixture of D) at least one of the compounds of the general formula III

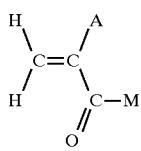

III in which:
A=H or $CH_3$
M=Cl or DH
D=O, S and

B) at least one ethylenically unsaturated compound having the general formula II

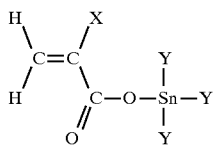

II in which:
X=H, $CH_3$
Y=$C_4$–$C_{12}$ alkyl, phenyl or cyclohexyl in which the molar ratio of D) to B) is from 1:1 to 5:1 and C) at least one ethylenically unsaturated compound in which the molar ratio of (D +B) to C is from 1:0 to 1:10, are polymerized and then, in stage 2 in a polymer-analogous reaction, the resulting copolymer produced in stage 1 is reacted in preferably equivalent amounts with one or more compounds of the general formula IV

R—Z    IV in which:
Z=a functional group which can react with M, such as DH, Cl
M=Cl, DH D=O,S
R=Ph($R^1$)$_n$, —C($CH_2COOR^2$)$_2$, —$CH_2$—$CH_2$—O—Ph, —C(H)$_{3-(p+q)}$(CO—$R^2$)$_p$(COO$R^2$)$_q$, —C($CH_2COOR^2$)$_2$(COO$R^2$) or unsubstituted or substituted thiadiazolyl compounds,
Ph=phenyl
$R^1$=identical or different in each occurance and is —C(O)H, —COO$R^2$, —$CH_2$—COO$R^2$, —O—$R^2$, —NH—CO—$R^2$, —$NH_2$, halogen
n=1-3
p=0-3
q=0-3
p+q=1-3
$R^2$=identical or different and each is H, or an unsubstituted or substituted alkyl, aryl, cycloalkyl or aralkyl radical having 1–10 carbon atoms.

The unsubstituted or substituted thiadiazolyl compounds (R in formula I and IV) can be 1,2,3-thiadiazoles, unsubstituted or substituted in position 3 by halogen, $C_1$–$C_4$ alkyl or aryl such as phenyl.

Other items provided by the invention are indicated in the claims.

DETAILED DESCRIPTION OF THE INVENTION

As component A for preparing binders for antifouling paints it is possible to use, for example, aliphatic esters or carbonyl-substituted esters of acrylic acid and methacrylic acid, for example triethylcitryl methacrylate, ethyl 2-methacryloyloxy-acetoacetate, diethyl methacryloyloxymalonate, 3-methacryloyloxyacetylacetone;

ester-substituted phenyl esters of acrylic acid and methacrylic acid, for example 4-methacryloyloxymethyl-benzoate, 4-methacryloyloxypropylbenzoate, 2-methacryloyloxymethylsalicylate;

formyl-substituted phenyl esters of acrylic acid and methacrylic acid, for example 2-formylphenylmethacrylate, 5-bromo-2-methacryloyloxybenzaldehyde;

halogen-substituted phenyl esters of acrylic acid and methacrylic acid, for example 4-bromophenyl methacrylate, 2,4,6-tribromophenyl methacrylate, 2,4,6-trichlorophenyl methacrylate;

alkoxy-substituted phenyl esters of acrylic acid and methacrylic acid, for example 2-methoxyphenyl methacrylate, 4-methoxyphenyl methacrylate, 4-ethoxyphenyl methacrylate;

carboxyl-substituted phenyl esters of acrylic acid and methacrylic acid, for example 2-methacryloyloxy-salicylic acid, 4-methacryloyloxybenzoic acid;

amide-substituted phenyl esters of acrylic acid and methacrylic acid, for example 4-methacryloyloxy-acetanilide;

aromatic and aliphatic thioesters of acrylic acid and methacrylic acid, for example 4-chlorothiophenyl methacrylate, 2-aminothiophenyl methacryl$^{ate,}$ 2,6-dichalorothiophenyl methacrylate, 4-methoxythiophenyl methacrylate, ethyloxythioglycolic acid methacrylate, methyloxythioglycolic acid methacrylate, methacrylic acid S-thioglycolic acid ester;

methacryloyloxy acetic acid derivatives, for example ethacryloyloxy acetic acid, methoxycarbonylmethyl methacrylate, t-butoxycarbonylmethyl methacrylate;

1,2,4-thiadiazolyl S-esters of acrylic acid and methacrylic acid, for example 3-chloro-5-methacryloyl-thio-1,2,4-thiadiazole, 3-phenyl-5-methacryloylthio-1,2,4-thiadiazole;

2-phenoxyethyl esters of acrylic acid and methacrylic acid, for example 2-phenoxyethyl methacrylate.

It is preferred to employ triethylcitryl methacrylate, diethyl methacryloyloxymalonate, 3-methacryloyloxyacetylacetone, 4-methacryloyloxymethyl-benzoate, 2-methacryloyloxymethylsalicylate, 2,4,6-tribromophenyl methacrylate, 2,4,6-trichlorophenyl methacrylate, 4-methacryloyloxybenzoic acid, 4-methoxyphenyl methacrylate, 2-formylphenyl methacrylate, 5-bromo-2-methacryloyloxybenzaldehyde, 4-chlorothiophenyl methacrylate, ethyloxythioglycolic acid methacrylate, methacryloyloxy acetic acid, methoxycarbonylmethyl methacrylate, t-butoxycarbonyl-methyl methacrylate, 3-phenyl-5-methacryloylthio-1,2,4-thiadiazole and 2-phenoxyethyl methacrylate.

As component B) for preparing binders for antifouling paints it is possible to employ tin-containing monomers such as tributyltin methacrylate, trioctyltin methacrylate, tributyltin acrylate, triphenyltin acrylate. Preference is given to employing tributyltin methacrylate.

The ethylenically unsaturated compounds C which can also he used in accordance with the invention are monomers such as:

1) carboxyl-containing compounds, for example acrylic acid, methacrylic acid, maleic acid, itaconic acid
2) $C_1$–$C_{18}$ esters of acrylic acid and methacrylic acid, for example methyl acrylate, ethyl acrylate, propyl acrylate, n-butyl acrylate, n-hexyl acrylate, methyl methacrylate, ethyl methacrylate, propyl methacrylate, i-propyl methacrylate, n-butyl methacrylate, n-hexyl methacrylate or n-dodecyl methacrylate; $C_2$–$C_{18}$ alkoxy esters of acrylic acid and methacrylic acid, for example methoxyethyl acrylate, methoxybutyl metacrylate, ethoxybutyl acrylate or ethoxybutyl methacrylate; $C_2$–$C_8$ hydroxyalkyl acrylates and hydroxyalkyl methacrylates, for example hydroxyethyl acrylate, hydroxyethyl methacrylate, hydroxypropyl acrylate or hydroxypropyl methacrylate; silicon-containing esters of acrylic acid and methacrylic acid, for example (3-methacryloyloxypropyl) trimethoxysilane, (3-methacryloyloxypropyl) triethoxysilane, trimethylsilyl methacrylate; amides of acrylic acid and methacrylic acid, for example methacrylamide, N,N-dimethylaminopropylmethacrylamide, N,N-dimethylacrylamide
3) vinyl compounds, for example styrene, α-methylstyrene, vinyltoluene, p-chlorostyrene, vinyl acetate, 4-vinylpyridine or N-vinylpyrrolidone.

As component D for preparing binders for antifouling paints it is possible, for example, to use acrylic acid, methacrylic acid, thiomethacrylic acid, methacryloyl chloride and acryloyl chloride.

Examples of compounds of the general formula IV are aliphatic and aromatic alcohols and thiols and also aliphatic and aromatic chloro derivatives.

The antifouling binder systems are prepared by free-radical or ionic copolymerization of the monomers according to the invention with (if used) the ethylenically unsaturated compounds. As free-radical initiators it is possible to use conventional compounds containing peroxide or azo groups, such as dibenzoyl peroxide, bis(α,α-dimethylbenzyl) peroxide, tert-butyl hydroperoxide, potassium peroxodisulfate, 2, 2'-azo-bisisobutyronitrile and 2, 2'-azobis(2-methyl-butyronitrile), in concentrations of from 0.01 to 2% by weight of the monomer mixture employed. The copolymerization is preferably conducted in appropriate solvents as a solution polymerization or precipitation polymerization. Solvents suitable for this purpose are aromatic and aliphatic hydrocarbons, such as toluene, xylene, hexane, heptane and petroleum spirit; esters, such as ethyl acetate and butyl acetate; ketones, such as acetone, methyl ethyl ketone and methyl isobutyl ketone; ethers, such as ethylene glycol dimethyl ether, diethylene glycol dimethyl ether (diglyme), dibutyl ether, 1,4-dioxane, tetrahydrofuran and 1-methoxy-2-propanol, or solvents such as N,N-dimethylformamide, dimethyl sulfoxide, N-methylpyrrolidin-2-one, water, methanol or butanol, possibly as a mixture. The monomer concentration depending on the desired viscosity is between 5 and 80% by weight, based on the overall solution. The copolymerization itself can be conducted by means of known techniques, for example by heating the monomers together with the initiators in the solvent or by dropwise addition of the monomers to heated solvent. Depending on the composition of the monomer mixture and on the chosen conditions of copolymerization, the copolymers obtained differ in composition and have number-average molecular weights of from 5000 to 200,000.

The antifouling binders prepared in this way can if desired comprise auxiliaries and additives, such as pigments, biocides and stabilizers, as are described in U.S. Pat. No. 5,332,430, in order to improve their properties. Examples of pigments are titanium dioxide, active charcoal, iron oxide and blue pigments, and examples of biocides are copper oxide, copper thiocyanate, zinc oxide, zinc pyrithione, zinc bis(dimethyldithiocarbamate) and also compounds which comprise, for example, benzothiazoles, dithiocarbamates, triazines, thiadiazines, thiadiazoles, isothiazolines, quaternary ammonium salts. Examples of other additives are fillers such as silicon dioxide, kaolin and talc and auxiliaries such as bentonites, Aerosil and similar compounds.

The present invention is described in more detail in the following examples.

EXAMPLES

Example 1

General Synthesis Procedure for Preparing Monomers

In a three-necked flask, 1 mol of the respective starting compound containing alcoholic or phenolic OH groups were dissolved in 250 ml of chloroform. An equimolar mount of triethylamine was added, followed if desired by 20 mol% of 4-(dimethylamino)pyridine, and the solution was cooled to 0° C. Then an equimolar amount of (meth)acryloyl chiloride in 50 ml of chloroform was added dropwise with stirring from a dropping funnel over the course of about 1 h, the temperature being maintained at 0° C. After the end of the addition the mixture was stirred at 0° C. for 1 h. The batch was either brought back to room temperature and stirred for a further 8 h or heated under reflux for 3 h. It was then filtered to remove any precipitated salt. The chloroform solution was subjected to extraction by shaking with water, 1 N hydrochloric acid, saturated sodium carbonate solution and again with water, and the extracts were then dried over sodium sulfate. The crude product obtained after the chloroform had been stripped off could be purified by distillation or recrystallization.

Example 2
General Synthesis Procedure for Preparing Monomers

In a three-necked flask, 1 mol of the respective starting compound containing aliphatic or aromatic thiol groups was dissolved in 250 ml of anhydrous chloroform. An equimolar amount of pyridine and a spatula tip of hydroquinone were added and the solution was cooled to 0° C. Then an equimolar amount of (meth)acryolyl chloride in 50 ml of chloroform was added dropwise with stirring from a dropping funnel over the course of about 1 h, the temperature being maintained at 0° C. After the end of the addition the mixture was heated to reflux temperature and stirred at this temperature for 5 h. Any precipitated salt was removed by filtration and the chloroform solution was subjected to extraction by shaking with water, 10% sulfuric acid, saturated sodium, carbonate solution and again with water. After drying over sodium sulfate and removal of the chloroform, the crude products were obtained, which could be purified by distillation or recrystallization.

Example 3
General Synthesis Procedure for Preparing Monomers

In a three-necked flask, 1 mol of (meth)acrylic acid and 1.5 mol of triethylamine were combined and the mixture was stirred at room temperature for 1 h. Then 2 mol of the starting compound (chloro derivative) were added dropwise with stirring from a dropping funnel. The mixture was subsequently stirred at room temperature for 12 h. The precipitated salt was filtered off and washed with ethyl acetate. The filtrate was subjected to extraction by shaking twice with saturated sodium hydrogen carbonate solution and once with water and the extracts were dried over sodium sulfate. The crude product could be purified by distillation or recrystallization.

Example 4
General Synthesis Procedure for Preparing Monomers

In a three-necked flask, 0.25 mol of the thiadiazole starting compound was dissolved in 1 L of absolute acetone under a stream of nitrogen. 0.25 mol of N,N'-dicyclohexylcarbodiimide in 100 ml of absolute acetone was added. 0.25 mol of (meth)acrylic acid in 100 ml of absolute acetone was added dropwise to the solution with stirring. After subsequent stirring for 2 days at room temperature the resulting N,N'-dicyclohexylurea was filtered off and the solvent was removed. The crude products formed could be recrystallized for purification.

Example 5
General Synthesis Procedure for Preparing Monomers

In a three-necked flask, 0.5 mol of the respective starting compound containing alcoholic or phenolic OH groups was dissolved in 500 ml of 5% strength aqueous NaOH. the solution was cooled to 0° C. Then 0.6 mol of methacryloyl chloride was added dropwise with stirring from a dropping funnel. The mixture was subsequently stirred at 0° C. for 2 h. The product which precipitated was filtered off and could be purified by recrystallization.

Example 6
Synthesis of Methacryloyloxyacetic Acid 25 g of t-butyloxycarbonyl methacrylate (synthesis as in Example 3), 200 ml of acetonitrile and 0.1 g of p-toluenesulfonic acid were combined and the mixture was heated under reflux for 3 h. The resulting oil was crystallized out by addition of petroleum ether. The crystals were filtered off, washed and dried in a drying oven.

TABLE 1

Synthesis of monomers

| Product | Starting compounds | Synthesis by Ex. No. | Yield {%} | Melting Point (F) Boiling point (K) | Degree of hydrolysis after 24 h |
|---|---|---|---|---|---|
| Triethylcitryl methacrylate | Triethyl citrate | 1 | 58.6% | K: 160° C. (0.1 mbar) | 80.4% |
| Diethyl methacryloyloxymalonate | Diethyl chlormalonate | 3 | 59% | K: 145° C. (0.1 mbar) | 72.9% |
| 4-Methacryloyloxy-methylbenzoate | Methyl 4-hydroxybenzoate | 1 | 62.2 | F: 67.8° C. | 54.8% |
| 2-Methacryloyloxy-methylsalicylate | Methyl salicylate | 1 | 51.3% | K: 120° C. (0.1 mbar) | 64.4% (4.5 h) |
| 2-Formylphenyl methacrylate | Salicylaldehyde | 1 | 61% | K: 120° C. (0.5 mbar) | 77.1% |
| 5-Bromo-2-methacryloyloxy-benzaldehyde | 5-Bromo-2-hydroxy-benzaldehyde | 1 | 22% | F: 52° C. | 35.6% |
| 2,4,6-Tribromophenyl methacrylate | 2,4,6-Tribromophenol | 1 | 78.8% | K: 140° C. (0.1 mbar) | 13.3% |
| 4-Methoxyphenyl methacrylate | 4-Methoxyphenol | 1 | 71.1% | F: 40° C. | 43.2% |
| 4-Methacryloyloxy-acetanilide | 4-Hydroxy-acetanilide | 5 | 65.0% | F: 126° C. | 32.9% |
| 4-Chlorothiophenyl methacrylate | 4-Chlorothio-phenol | 2 | 30% | K: 160° C. (0.5 mbar) | 78% |
| Ethyloxythioglycolic acid methacrylate | Ethyl thioglycolate | 2 | 60% | K: 115° C. (0.1 mbar) | 60.2% |
| Methacryloyoxyacetic acid | t-butoxycarbonyl-methyl methacrylate | 6 | 75.0 | F: 45° C. | 70.1% |
| Methoxycarbonylmethyl methacrylate | Methyl chloroacetate | 3 | 89% | K: 60° C. (0.1 mbar) | 63.1% (4.5 h) |
| t-Butoxycarbonylmethyl methacrylate | t-butyl chloroacetate | 3 | 94% | K: 65° C. (0.1 mbar) | 77.6% |

TABLE 1-continued

Synthesis of monomers

| Product | Starting compounds | Synthesis by Ex. No. | Yield {%} | Melting Point (F) Boiling point (K) | Degree of hydrolysis after 24 h |
|---|---|---|---|---|---|
| 3-Phenyl-5-methacryloylthio-1,2,4-thiadiazole | 5-Mercapto-3-phenyl-1,2,4-thiadiazole | 4 | 43% | F: 110° C. | 12.6% |
| Phenoxyethyl methacrylate | 2-Phenoxyethanol | 1 | 75.1% | K: 108° C. (0.1 mbar) | 68.1% |

Example 7
General Procedure for Copolymerizing the Monomers

The appropriate amount, depending on the desired copolymer composition, of component A (functionalized [meth]acrylate), of component B (tin-containing comonomer) and of component C (comonomer) were placed together with the solvent and the initiator in a three-necked flask. To remove oxygen, the solution was stirred for 30 minutes under a constant stream of nitrogen. The mixture was then heated to 80° C. and copolymerization was carried out under these conditions for 4 h. The solids content of the solution was measured. The copolymer could be obtained in pure form by precipitation in methanol or petroleum ether and isolation in a customary manner (filtration).

Example 8
Polymer-analogous Reaction:
Synthesis of the copolymer poly[methoxycarbonylmethyl methacrylate-stat*-tributyltin methacrylate-stat*-methyl methacrylate]

*) Stat=Statistical (random) Distribution 0.2 mol of methacrylic acid, 0.2 mol of tributyltin methacrylate and 0.4 mol of methyl methacrylate were copolymerized in methanol (in accordance with Example 7). The copolymer was precipitated in cold petroleum ether, filtered off and dried. 25 g of the copolymer obtained in this way were dissolved in 220 g of dimethylformamide in a three-necked flask. Following the addition of 10.5 g of triethylamine, the solution was stirred at room temperature for 1 h. Then 15.5 g of methyl chloroacetate were added from a dripping funnel and the mixture was stirred at room temperature for a further 12 h. The salt which precipitated was filtered off. The copolymer could be obtained in pure form from the filtrate (copolymer solution) by precipitation in methanol or petroleum ether and isolation in a known manner (filtration).

TABLE 2

Copolymerizations

| No | Monomer A | Monomer B | Monomer C | Solvent | Initiator AIBN: Azobisiso-butyronitrile | Tin content based on copolymer [% by wt.] | Solids content [% by wt.] |
|---|---|---|---|---|---|---|---|
| P1 | Triethylcitryl methacrylate (86.1 g) | Tributlytin methacrylate (93.8 g) | Methyl methacrylate (25.0 g) | Xylene (204.9 g) | AIBN (1.23 g) | 14.5 | 48.9 |
| P2 | Diethyl methacryloyl-oxymalonate (171.1 g) | Tributyltin methacrylate (93.8) | Methyl methacrylate (50.0 g) | Xylene (314.9 g) | AIBN (2.37 g) | 9.4 | 47.6 |
| P3 | 4-methacryloyl-oxymethyl-benzoate (55.1 g) | Tributyltin methacrylate (56.3 g) | Butyl methacrylate (35.6 g) | Xylene (147.0 g) | AIBN (1.07 g) | 12.1 | 50.3 |
| P4 | 4-methacryloyl oxymethyl-benzoate (110.1 g) | Tributyltin methacrylate (93.8 g) | | Xylene (203.9 g) | AIBN (1.23 g) | 14.4 | 49.1 |
| P5 | 2-Methacryloyl-oxymethyl-salicylate (56.1 g) | Tributlytin methacrylate (93.8 g) | Methoxyethyl acrylate (32.5 g) | Xylene (181.4 g) | AIBN (1.23 g) | 16.4 | 49.6 |
| P6 | 2-Formylphenyl methacrylate (57.1 g) | Tributlytin methacrylate (75.0 g) | Butyl methacrylate (35.6 g) | Butyl acetate (167.7 g) | AIBN (1.15 g) | 13.9 | 47.0 |
| P7 | 5-Bromo-2-methacryloyloxy-benzaldehyde (67.3 g) | Tributyltin methacrylate (93.8 g) | Dodecyl methacrylate (63.6 g) | Xylene (224.7 g) | AIBN (1.23 g) | 13.0 | 46.3 |
| P8 | 2,4,6-Tribromophenyl methacrylate (99.7 g) | Tributyltin methacrylate (93.8 g) | Butyl methacrylate (35.6 g) | Xylene (229.1 g) | AIBN (1.23 g) | 12.9 | 48.0 |

TABLE 2-continued

Copolymerizations

| No | Monomer A | Monomer B | Monomer C | Solvent | Initiator AIBN: Azobisiso-butyronitrile | Tin content based on copolymer [% by wt.] | Solids content [% by wt.] |
|---|---|---|---|---|---|---|---|
| P9 | 4-Methoxyphenyl-oxyacetanilide (96.1 g) | Tributyltin methacrylate (93.8 g) | Methyl methacrylate (25.0 g) | Toluene (214.9 g) | AIBN (1.64 g) | 13.5 | 47.3 |
| P10 | 4-Methacryloyl-oxyacetanilide (54.8 g) | Tributyltin methacrylate (93.8 g) | Butyl methacrylate (71.1 g) | Dimethyl-formamide (219 g) | AIBN (1.64 g) | 13.2 | 46.9 |
| P11 | 4-Chloro-thiophenyl methacrylate (53.2 g) | Tributlytin methacrylate (93.8 g) | Butyl methacrylate (35.6 g) | Butyl acetate (182.6 g) | AIBN (1.23 g) | 15.9 | 46.3 |
| P12 | Ethyloxythio-glycolic acid methacrylate (60.7 g) | Tributyltin methacrylate (75.0 g) | Methyl methacrylate (20.0 g) | Butyl acetate (155.7 g) | AIBN (1.15 g) | 15.2 | 47.1 |
| P13 | Meth-acryloyloxy-acetic acid (36.0 g) | Tributytin methacrylate (93.8 g) | Butyl methacrylate (35.6 g) | Dioxane (165.4 g) | AIBN (1.23 g) | 17.4 | 48.8 |
| P14 | Methoxycarbonyl methyl methacrylate (39.5 g) | Tributyltin methacrylate (93.8 g) | Methyl methacrylate (50.1 g) | Xylene (183.4 g) | AIBN (1.64 g) | 16.0 | 49.1 |
| P15 | Polymer-analogous reaction (Example 8): Poly [methoxycarbonylmethyl methacrylate-stat-tributyltin methacrylate-stat-methyl methacrylate] | | | Dimethyl-formamide | — | 15.8 | — |
| P16 | t-butoxycarbonyl-methyl methacrylate (50.1 g) | Tributyltin methacrylate (93.8 g) | Methyl methacrylate (50.1 g) | Xylene (194.0 g) | AIBN (1.64 g) | 15.1 | 49.6 |
| P17 | 3-Phenyl-5-methacryloyl-thio-1,2,4-thiadiazole (57.6 g) | Tributyltin methacrylate (93.8 g) | Methoxyethyl acrylate (65.1 g) | Dimethyl-formamide (216.5 g) | AIBN (1.64 g) | 13.5 | 47.1 |
| P18 | 2-Pheonoxyethyl methacrylate (51.6 g) | Tributylin methacrylate (93.8 g) | Methyl methacrylate (25.0 g) | Xylene (170.4 g) | AIBN (1.23 g) | 17.4 | 49.0 |

Determination of the Degree of Hydrolysis

To determine the degrees of hydrolysis of the binder systems according to .the invention in alkaline medium, measurement was made of the changes in conductivity and pH as a function of time. Direct measurement in sea water (pH: 8.1–8.3) was not possible for technical reasons (high intrinsic conductivity owing to the salt content).

The measurements were conducted as follows:

300 ml of double-distilled and degassed water were adjusted to a pH of 12 by adding NaOH platelets in a three-necked flask fitted with a stirrer, a pH electrode (WTC, type E50-1.5) and a conductivity electrode (WTW, type LTA 1, cell constant 0.996). The entire system was thermostatically controlled at 25°±0.1° C. (Haake Thermostat GH-D8). The meters employed were a pH meter (WTW type pH 192) and a conductivity meter (WTW, type LF 530).

The monomeric compounds of Table 1 were introduced into the aqueous solution. In the case of the binder systems in solution according to Table 2, the solution was applied to glass beads with a diameter of 3 mm and the solvent was removed with the aid of a vacuum pump, in order to obtain film thickness conditions relevant to actual practice. The initial amount of the polymeric binder system was chosen such that an excess of sodium hydroxide of about 50% remained after theoretically complete hydrolysis.

To determine the degrees of hydrolysis, the coated glass beads were placed in the abovementioned solution. The changes in pH and conductivity as a function of time were measured directly in the solution, which was stirred for better mixing. The measurement period was 24 h.

The calculation of the degree of hydrolysis was based on the change in pH, which was reduced as a result of the hydrolysis of the corresponding functional groups (formation of carboxyl groups). By measuring the pH after 24 h (initial pH: 12.00) and calculating the number of functional groups (based on the initial amount) it was possible to determine the degree of hydrolysis (in %, based on the number of hydrolyzable functional groups).

The results for the monomers (see Table 1) and the following Table 3 show clearly that the polymeric binder systems according to the invention hydrolyzed in an alkaline medium under the chosen conditions.

TABLE 3

Hydrolysis of polymeric binder systems

| Binder System | Percentage of potentially hydrolyzable groups which are hydrolyzed within 24 h |
|---|---|
| P1 | 32.8% |
| P2 | 27.1% |
| P3 | 26.2% |
| P4 | 24.9% |
| P5 | 28.9% |
| P6 | 34.9% |
| P7 | 28.0% |
| P8 | 29.2% |
| P9 | 26.1% |
| P10 | 24.1% |
| P11 | 32.5% |
| P12 | 28.3% |
| P13 | 39.3% |
| P14 | 32.4% |
| P15 | 29.8% |
| P16 | 29.6% |
| P17 | 23.2% |
| P18 | 33.2% |
| Comparison examples: | |
| Poly(methyl methacrylate) | 3.0% |
| Poly[tributyltin methacrylate-stat-methyl methacrylate] {1:2, mol:mol} | 30.9% |

The effectiveness of the binder systems according to the invention against marine organisms was determined by exposure tests in the North Sea (Cuxhaven).

For this purpose, test plates made of polyvinyl chloride (10×15×0.4 cm) were provided with antifouling paints prepared in accordance with Example 9.

Example 9
General Procedure for Preparing Antifouling Coating Compositions 75 g of the respective copolymer (e.g. P1 -P18) as a 40–50% solution, 5 g of copper (I) oxide, 13 g of zinc oxide, 11.1 g of Bentone 38 (gelling agent based on montmorillonite earth, Titangesellschaft, 6% solution in xylene) and 10 g of xylene were milled intensively for one hour. This gave the antifouling paints 1 to 18 (Table 4).

After degreasing with solvents (e.g. acetone) the PVC plates were painted twice with the antifouling paint and dried at room temperature for 48 h. The dry film thickness was 80–120 μm. The coated PVC plates were then clamped in a plastic frame and stored permanently about 0.5–1.5 m below the surface of the water for a period of 12 months. Comparison data were obtained from untreated PVC plates, a test coating of poly[tributyltin methacrylate-stat-methyl methacrylate] {1:2, mol:mol; commercially used binder, tin content of the copolymer: 20.6% by weight}, a test coating of poly[tributyltin methacrylate-stat-methyl methacrylate] {1:3. mol:mol; reduced tin content of the copolymer: 17.6% by weight} and a tin-free test coating of polymethyl methacrylate as nonfunctionalized polymer component, which were prepared in accordance with Example 9.

Table 4 below shows clearly that the binders with reduced tin content and functionalized (meth)acrylates, according to the invention, exhibit a biocidal activity against animal and vegetable infestation during the period of observation. The test coating poly[tributyltin methacrylate-stat-methylmethacrylate] {1:3, mol:mol}, with its reduced tin content and without the functionalized (meth)acrylates according to the invention, in contrast, exhibits a markedly poorer antifouling effectiveness. The tin-free plates with the compounds according to the invention showed almost complete plate infestation by algae, balanids and bivalves.

TABLE 4

Sea water storage of test plates in Cuxhaven

| Coating | 3 months | 6 months | 12 months |
|---|---|---|---|
| Antifouling paint 1 | 0 | 0 | 0 |
| Antifouling paint 2 | 0 | 0 | 0 |
| Antifouling paint 3 | 0 | 0 | 0 |
| Antifouling paint 4 | 0 | 0 | 10 |
| Antifouling paint 5 | 0 | 0 | 0 |
| Antifouling paint 6 | 0 | 0 | 0 |
| Antifouling paint 7 | 0 | 0 | 5 |
| Antifouling paint 8 | 0 | 0 | 0 |
| Antifouling paint 9 | 0 | 0 | 0 |
| Antifouling paint 10 | 0 | 0 | 10 |
| Antifouling paint 11 | 0 | 0 | 0 |
| Antifouling paint 12 | 0 | 0 | 0 |
| Antifouling paint 13 | 0 | 0 | 5 |
| Antifouling paint 14 | 0 | 0 | 0 |
| Antifouling paint 15 | 0 | 0 | 0 |
| Antifouling paint 16 | 0 | 0 | 0 |
| Antifouling paint 17 | 0 | 0 | 10 |
| Antifouling paint 18 | 0 | 0 | 0 |
| Comparison examples | | | |
| Untreated PVC plate | 30 | 80 | 100 |
| PMMA coating | 20 | 80 | 100 |
| Poly[tributyltin methacrylate-stat-methyl methacrylate] {1:2, mol:mol} | 0 | 0 | 0 |
| Poly[tributyltin methacrylate-stat-methyl methacrylate] {1:3, mol:mol} | 0 | 20 | 60 |

Numerical data: % of the infested area, relative to the overall area
0 = no infestation
100 = complete infestation

What is claimed is:

1. A binder for antifouling coating compositions, which is prepared by copolymerizing a mixture of polymerizable monomers which comprises a mixture of A) one or more compounds selected from the group consisting of triethylcitryl methacrylate, diethyl methacryloyloxymalonate, 3-methacryloyloxyacetylacetone, 4-methacryloyloxymethyl-benzoate, 2-methacryloyloxymethylsalicylate, 2,4,6-tribromophenyl methacrylate, 2,4,6-trichlorophenyl methacrylate, 4-methacryloyloxybenzoic acid, 4-methoxyphenyl methacrylate, 2-formylphenyl methacrylate, 5-bromo-2-methacryloyloxybenzaldehyde, 4-chlorothiophenyl methacrylate, ethyloxythioglycolic acid methacrylate, methacryloyloxy acetic acid, methoxycarbonylmethyl methacrylate, t-butoxycarbonyl-methyl methacrylate, and 3-phenyl-5-methacryloylthio-1,2,4-thiadiazole; and B) at least one ethylenically unsaturated compound having the general formula II

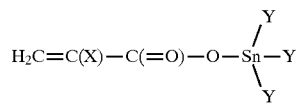

in which
X is H or CH$_3$ and

Y is $C_4$–$C_{12}$ alkyl, phenyl or cyclohexyl in which the molar ratio of A to B is from 1:1 to 5:1 and optionally C) at least one ethylenically unsaturated compound, wherein the molar ratio (A+B) to C is from 1:0 to 1:10.

2. The binder as claimed in claim 1, wherein the ratio of A to B is from 1.5:1 to 3:1 and the ratio of (A+B) to C is between 1:0 and 1:5.

3. The binder as claimed in claim 1, wherein the polymerizable monomer of component A) is a compound of the general formula I

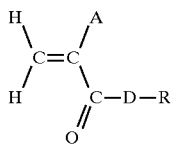

in which:
=H or $CH_3$
D=O,S
R=$Ph(R^1)_n$, —$C(CH_2COOR^2)_2(COOR^2)$, —$CH_2$—$CH_2$—O—Ph, —$CH_2$—$COOR^2$, or a substituted or unsubstituted thiadiazolyl compound
Ph=phenyl
$R^1$=identical or different in each occurrence and is —C(O)H, —$COOR^2$, —O—$R^2$, or halogen
n=1–3
$R^2$=identical or different in each occurrence and is H, or an unsubstituted or substituted alkyl, aryl, cycloalkyl or aralkyl radical having 1–10 carbon atoms
and component B) is tributyltin methacrylate.

4. The binder as claimed in claim 3, wherein the ratio of A to B is from 1.5:1 to 3:1 and the ratio of (A+B) to C is between 1:0 and 1:5.

5. The binder as claimed in claim 1 wherein component A) is selected from the group consisting of triethylcitryl methacrylate, diethyl methacryloyloxymalonate, 3-methacryloyloxyacetylacetone, 4-methacryloyloxymethyl-benzoate, 2-methacryloyloxymethyl-salicylate, 2,4,6-tribromophenyl methacrylate, 2,4,6-trichlorophenyl methacrylate, 4-methacryloyloxybenzoic acid, 4-methoxyphenyl methacrylate, 2-formylphenyl methacrylate, 5-bromo-2-methacryloyloxybenzaldehyde, 4-chlorothiophenyl methacrylate, ethyloxythioglycolic acid methacrylate, methacryloyloxy acetic acid, methoxycarbonylmethyl methacrylate, t-butoxycarbonyl-methyl methacrylate, and 3-phenyl-5-methacryloylthio-1,2,4-thiadiazole;

component B) is tributyltin methacrylate; and component C), if present, is selected from the group consisting of methacrylic acid, butyl acrylate, methyl-methacrylate, butyl methacrylate, n-hexyl methacrylate, n-dodecyl methacrylate, 2-hydroxyethyl methacrylate, 2-methoxyethyl acrylate, 3-methacryloyl-oxypropyltrimethoxysilane, and mixtures thereof.

6. The binder as claimed in claim 5, wherein the ratio of A to B is from 1.5:1 to 3:1 and the ratio of (A+B) to C is between 1:0 and 1:5.

7. A binder for antifouling coating compositions produced by polymerizing in a first stage a mixture of D) at least one of the compounds of the general formula III

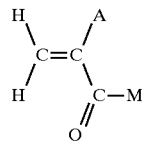

in which:
A=H or $CH_3$
M=Cl or DH
D=O,S and
B) at least one ethylenically unsaturated compound having the general formula II

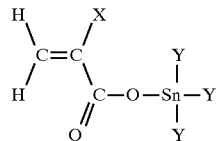

in which:
X=H or $CH_3$
Y=$C_4$–$C_{12}$ alkyl, phenyl or cyclohexyl in which the molar ratio of D) to B) is from 1:1 to 5:1 and optionally C) at least one ethylenically unsaturated compound in which the molar ratio of (D+B) to C is from 1:0 to 1:10.

and then, in a second stage, reacting the copolymer resulting from the first stage with one or more compounds of the general formula IV

R—Z          IV in which:
Z=a functional group which can react with M
M=Cl or DH
D=O or S
R=$Ph(R^1)_n$, —$C(CH_2COOR^2)_2$, —$CH_2$—$CH_2$—O—Ph, —$C(H)_{3-(p+q)}(CO—R^2)_p(COOR^2)_q$, —$C(CH_2COOR^2)_2(COOR^2)$ or thiadiazolyl which is unsubstituted or substituted by halogen, $C_1$–$C_4$ alkyl or aryl,
Ph=phenyl
$R^1$=identical or different in each occurrence and is —C(O)H, —$COOR^2$, —$CH_2$—$COOR^2$, —O—$R^2$, —NH—CO—$R^2$—$NH_2$ or halogen
n=1–3
p=0–3
q=0–3
p+q=1–3
$R^2$=identical or different in each occurrence and is H, or an alkyl, aryl, cycloalkyl or aralkyl radical having 1–10 carbon atoms which is unsubstituted or substituted with halo, alkoxy, amide, aldehyde, formyl or amino.

8. An antifouling coating composition comprising a binder prepared according to claim 1 and, one or more auxiliary additive selected from the group consisting of pigments, antisettling agents, solvents, biocides and stabilizers.

9. An antifouling coating composition comprising a binder prepared according to claim 2 and, one or more auxiliary additive selected from the group consisting of pigments, antisettling agents, solvents, biocides and stabilizers.

10. An antifouling coating composition comprising a binder prepared according to claim 3 and, one or more auxiliary additive selected from the group consisting of pigments, antisettling agents, solvents, biocides and stabilizers.

11. An antifouling coating composition comprising a binder prepared according to claim 4 and, one or more auxiliary additive selected from the group consisting of pigments, antisettling agents, solvents, biocides and stabilizers.

12. An antifouling coating composition comprising a binder prepared according to claim 5 and, one or more auxiliary additive selected from the group consisting of pigments, antisettling agents, solvents, biocides and stabilizers.

13. An antifouling coating composition comprising a binder prepared according to claim 6 and, one or more auxiliary additive selected from the group consisting of pigments, antisettling agents, solvents, biocides and stabilizers.

14. A binder according to claim 7 wherein Z is DH or Cl, provided that Z and M are not simultaneously Cl.

* * * * *

UNITED STATES PATENT AND TRADEMARK OFFICE
CERTIFICATE OF CORRECTION

PATENT NO.   : 5,891,935
DATED        : April 6, 1999
INVENTOR(S)  : Uwe Schneider It is certified that error appears in the above-identified patent and that said Letters Patent is hereby corrected as shown below:

Column 4,
Line 59, "methacryl $^{ate}$" should read -- methacrylate --
Line 60, "dichalorothiophenyl" should read -- dichlorothiophenyl --

Column 5,
Line 27, "he" should read -- be --

Column 8,
Line 19, "the" should read -- The --

Column 11,
Line 45, ".the" should read -- the --

Column 15,
Line 21, "=H" should read -- A=H --

Signed and Sealed this

Eleventh Day of December, 2001

Attest:

NICHOLAS P. GODICI
Attesting Officer    Acting Director of the United States Patent and Trademark Office